United States Patent [19]

Matzek

[11] Patent Number: 4,506,237
[45] Date of Patent: Mar. 19, 1985

[54] ADJUSTABLE SLOPE EQUALIZER

[75] Inventor: Lester T. Matzek, Lombard, Ill.

[73] Assignee: Rockwell International Corporation, El Segundo, Calif.

[21] Appl. No.: 445,612

[22] Filed: Nov. 30, 1982

[51] Int. Cl.³ .......................... H04B 3/14; H03H 7/03
[52] U.S. Cl. ..................................... 333/28 R; 330/304
[58] Field of Search ............ 333/28 R; 330/304, 302, 330/107, 109; 179/170.6, 170.2, 170.8

[56] References Cited

U.S. PATENT DOCUMENTS 4,217,562  8/1980  Rollett et al. ..................... 333/28 R
4,354,160 10/1982  Pierce ............................ 333/28 R X

FOREIGN PATENT DOCUMENTS 11446   5/1980  European Pat. Off. .......... 333/28 R
7322712 1/1975  France ............................ 333/28 R Primary Examiner—Paul L. Gensler
Assistant Examiner—Benny Lee
Attorney, Agent, or Firm—C. B. Patti; V. L. Sewell; H. F. Hamann

[57] ABSTRACT

An adjustable slope equalizer is disclosed for maintaining a predetermined output level at a predetermined frequency. An equalizer comprises: an adjustable input means; a first voltage divider means having an output and having an input operatively connected to the low impedance input means; a second voltage divider means having an output and having an input operatively connected to the low impedance input means; an adjustable high impedance means having an output and having at least two inputs operatively connected to the outputs of the first and second voltage divider means; and a SAG correction means operatively connected to the output of the adjustable high impedance means. The output of the SAG correction means has the predetermined output level at the predetermined frequency for any setting of the adjustable high impedance means.

9 Claims, 4 Drawing Figures

4,506,237

ADJUSTABLE SLOPE EQUALIZER

BACKGROUND OF THE INVENTION

This invention relates in general to slope equalizers for providing different gains for different frequencies, and in particular, to equalizer circuits used in repeaters for telephone communication systems.

Prior art slope equalizers have a gain adjustment and a slope adjustment. In a telephone communication line the higher frequencies are attenuated more than the lower frequencies. Depending upon the amount of attenuation of the frequencies the slope of the equalizer must be adjusted, as well as the gain of the system. Typically, the gain is set for a frequency of 1.0 kilohertz. However, when the slope is adjusted, the gain is affected. The slope and gain must be alternately adjusted until a close approximation of the correct setting is achieved.

SUMMARY

The present invention involves an adjustable slope equalizer for maintaining a predetermined output voltage level at a predetermined frequency. The equalizer comprises: an adjustable input means; a first voltage divider means having an output and having an input operatively connected to the low impedance input means; a second voltage divider means having an output and having an input operatively connected to the low impedance input means; an adjustable high impedance means having an output and having at least two inputs operatively connected to the outputs of the first and second voltage divider means; and a sag correction means operatively connected to the output of the adjustable high impedance means. The output of a sag correction means has the predetermined output voltage level at the predetermined frequency for any setting of the adjustable high impedance means.

OBJECTS OF THE INVENTION

It is a primary object of the present invention to provide an adjustable slope equalizer having a constant output level at one kilohertz.

It is another object of the present invention to provide a slope equalizer having independent gain and slope adjustments.

It is another object of the present invention to provide an adjustable slope equalizer which is economical to manufacture.

BRIEF DESCRIPTION OF THE DRAWINGS

The features of the present invention which are believed to be novel are set forth with particularity in the appended claims. The invention together with further objects and advantages may best be understood by reference to the following descriptions taken in conjunction with the accompanying drawings, in the several figures of which like reference numerals identify like elements, and in which:

DESCRIPTION OF THE PREFERRED EMBODIMENT

Whereas the invention may be utilized in various applications, it is preferrably embodied in a circuit for use with telephone communication transmission lines and equipment such as repeaters. The present invention provides an adjustable slope equalizer with independent gain and slope adjustments.

Figure 1:
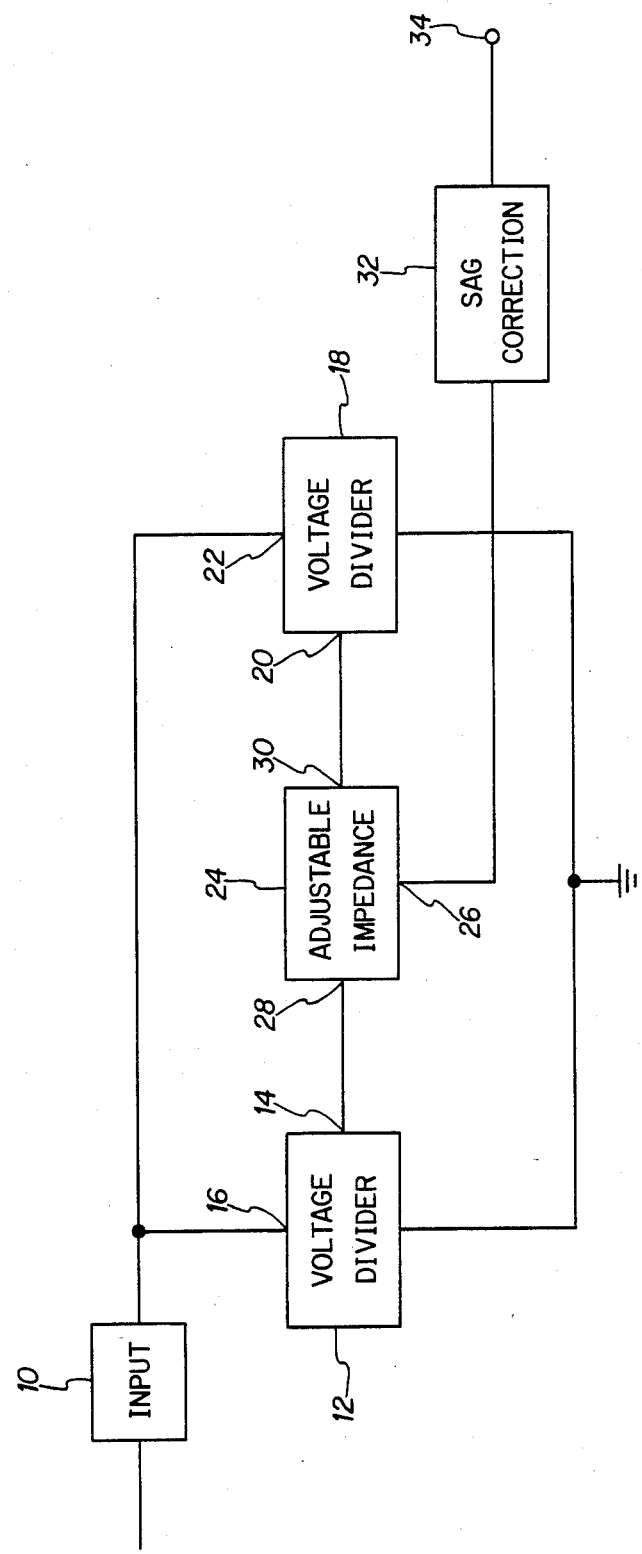
FIG. 1 is a description of the present invention in block diagram form.

In general, the present invention provides an equalizer for maintaining a predetermined output level at a predetermined frequency. As shown in FIG. 1, the equalizer first comprises an adjustable input means. A first voltage divider means 12 has an output 14 and an input 16 operatively connected to the adjustable input means 10. A second voltage divider means 18 has an output 20 and an input 22 operatively connected to the input means 10. An adjustable high impedance means 24 has a output 26 and at least 2 inputs 28 and 30 operatively connected to the outputs 14 and 20 of the first and second voltage divider means 12 and 18. A sag correction means 32 is operatively connected to the output 26 of the adjustable high impedance means 24. An output 34 of the sag correction means 32 has the predetermined output voltage level at the predetermined frequency for any setting of the adjustable high impedance means 24.

Figure 2:
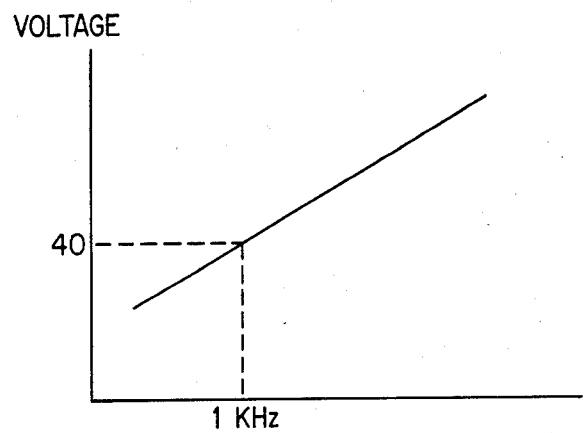
FIG. 2 and FIG. 3 are graphs of the frequency response of the present invention at different locations in the circuit.
Figure 3:
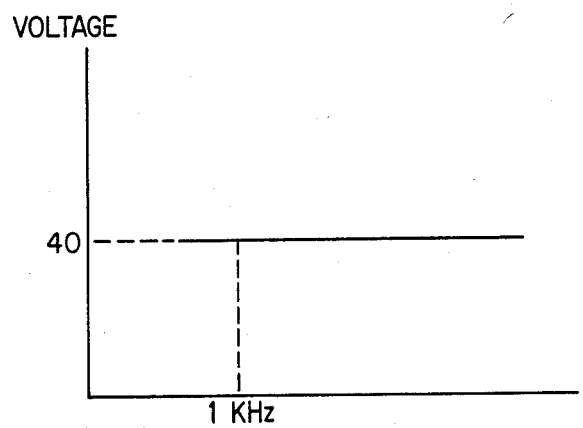

FIGS. 2 and 3 are graphs of the frequency response of outputs 14 and 20 of the first and second voltage divider means 12 and 18 illustrating the constant output voltage level 40 for one kilohertz.

The correction means 32 is necessary to prevent a sag in the frequency response at the 1.0 kilohertz frequency. The sag in the response is created by the user of a capacitor in the first voltage divider means 12 as will be explained later.

Figure 4:
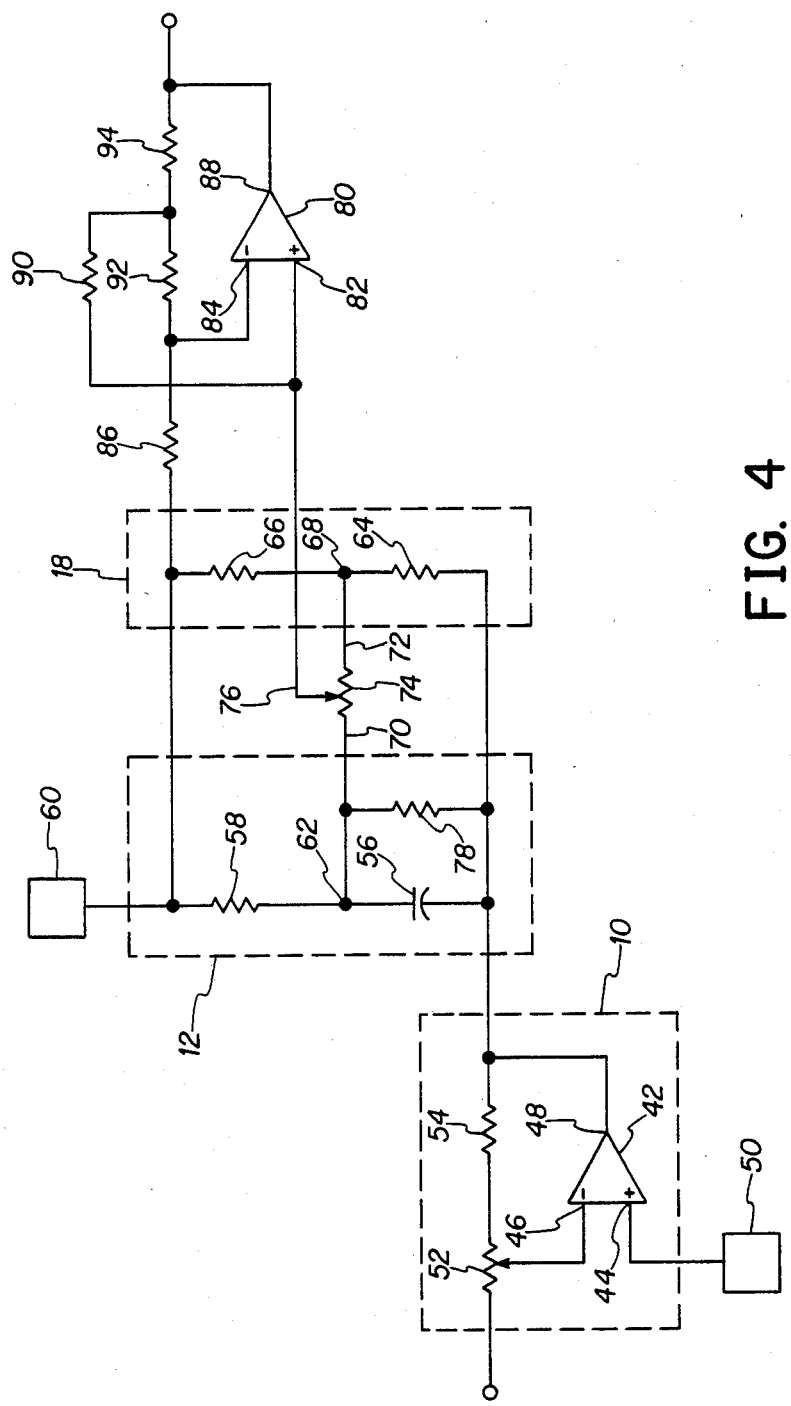
FIG. 4 is a schematic circuit diagram of the present invention.

FIG. 4 is an electronic circuit diagram embodying the present invention. The adjustable input means 10 comprises an operational amplifier 42 with its positive input 44 connected to a negative voltage source 50 and its negative input 46 connected to a potentiometer 52 as shown in FIG. 4. A feedback resistor 54 is connected from the output 48 to potentiometer 52. The potentiometer 52 is used to set the gain of the system for 1.0 kilohertz.

The first voltage divider 12 comprises a capacitor 56 in series with a first resistor 58. The capacitor 56 is connected to the output 48 of amplifier 42 and the resistor 58 is connected to a negative voltage source 60. The junction of the capacitor 56 and the resistor 58 forms an output 62. The second voltage divider 18 comprises second and third resistors 64 and 66 which are connected in series between the output 48 of the amplifier 42 and the negative voltage source 60. The junction of the resistors 64 and 66 forms an output 68.

The adjustable high impedance 24 has two inputs 70 and 72 connected to the outputs 62 and 68 of the first and second voltage dividers 12 and 18, respectively. The adjustable high impedance 24 is a potentiometer 74 with the wiper arm being an output 76. Resistor 78 is connected in parallel with capacitor 56 and limits the amount of slope of the equalizer. The potentiometer 74 is a high impedance at the output 76 when compared to the impedances of the outputs 62 and 68 of the first and second voltage dividers 12 and 18. The sag correction means 32 comprises a second operational amplifier 80 with its positive input 82 connected to the output 76 of the adjustable impedance 24 and its negative input 84 connected to the negative voltage source 60 through resistor 86. A positive resistive feedback circuit is connected between the output 88 of the second operational amplifier 80 and the positive input 82 and comprises resistor 90. A negative resistive feedback circuit is connected between the output 88 and the negative input 84 and comprises resistor 92. Resistor 94 is provided as shown in FIG. 4 to divide down the output before the negative and positive feedback circuits are applied.

In operation, the positive feedback at the output 76, at the midpoint of the potentiometer 74, is greater than it is at either end 62 or 68 of the potentiometer 74.

A sag occurs when the output at the predetermined frequency at the output 76 of the potentiometer is lower than it is at the ends 62 and 68 of the potentiometer 74.

The sag occurs because although the voltage amplitude at the ends 62 and 68 of the potentiometer 74 is equal, capacitor 56 which provides the slope at the one end 62, also causes the phase to be different than at 68, resulting in a sixty degree phase shift at 1.0 Khz.

The circuit shown in FIG. 4 may be used in the transmit portion of the repeater and a similar circuit may be used in the receive portion. Only minor changes are needed depending on the application.

The invention is not limited to the particular details of the apparatus depicted and other changes and modifications are contemplated. Certain other changes may be made in the above described apparatus without departing from the true spirit and scope of the invention herein involved. It is intended therefore that the subject matter in the above depiction shall be interpreted as illustrative and not in a limiting sense.

What is claimed is:

1. An adjustable slope equalizer for maintaining a predetermined output level at a predetermined frequency, said equalizer comprising:
    an adjustable input means having an operational amplifier means having an adjustable gain:
    a first voltage divider means having an output and having an input operatively connected to said adjustable input means;
    a second voltage divider means having an output and having an input operatively connected to said adjustable input means;
    an adjustable high impedance means having an output and having at least two inputs operatively connected to said outputs of said first and second voltage divider means; and
    a sag correction means operatively connected to said output of said adjustable high impedance means; wherein an output of said sag correction means has a predetermined output voltage level at the predetermined frequency for any setting of said adjustable high impedance means.

2. The circuit described in claim, 1 wherein said SAG correction means comprises an operational amplifier means having at least a positive input, a negative input and an output, said positive input being connected to said output of said adjustable high impedance means, and a feedback circuit connected between said output and said positive and negative inputs of said operational amplifier means.

3. The circuit described in claim 2, wherein said feedback circuit comprises a positive resistance circuit connected between said output and said positive input of said operational amplifier and a negative resistive feedback circuit connected between said output and said negative input of said operational amplifier.

4. The circuit described in claim 1, wherein said first voltage divider means comprises a capacitor in series with a first resistor and wherein said output is a junction of said capacitor and said resistor.

5. The circuit described in claim 1, wherein said second voltage divider means comprises second and third resistors, and wherein said output is the junction of said first and second resistors.

6. The circuit described in claim 1, wherein said adjustable high impedance means is a high impedance potentiometer.

7. The circuit described in claim, 1 wherein said adjustable input means comprises an operational amplifier means having an adjustable gain.

8. The circuit described in claim 1, wherein said adjustable slope equalizer has a constant amplitude output at 1.0 Khz as the frequency slope response is changed by adjustment of said potentiometer.

9. An adjustable slope equalizer for maintaining a predetermined output level at 1.0 Khz, said equalizer comprising:
    a first operational amplifier having an adjustable gain for establishing the predetermined output level of said equalizer;
    a capacitor connected to an output of said first operational amplifier, and a resistor connected in series with said capacitor to form a first voltage divider;
    second and third resistors connected in series to form a second voltage divider with said second resistor connected to said output of said first operational amplifier;
    a high impedance potentiometer connected between the junction of said capacitor and said first resistor and the junction of said second and third resistors, a wiper arm of said potentiometer forming an output of said potentiometer;
    a second operational amplifier having a positive input connected to said output of said potentiometer and having a negative input and an output;
    a positive resistive feedback circuit connected between said output of said second operational amplifier and said positive input of said second operational amplifier; and
    a negative resistive feedback circuit connected between said output of said second operational amplifier, and said negative input of said second operational amplifier, such that said positive and negative feedback circuits provide proper sag correction to keep the output level constant for 1.0 Khz as the frequency slope response of said equalizer is changed by adjustment of said potentiometer.

* * * * *